April 11, 1933. W. A. KNOX 1,903,462
HEADLIGHT ATTACHMENT FOR AUTOMOBILES
Filed Dec. 26, 1931
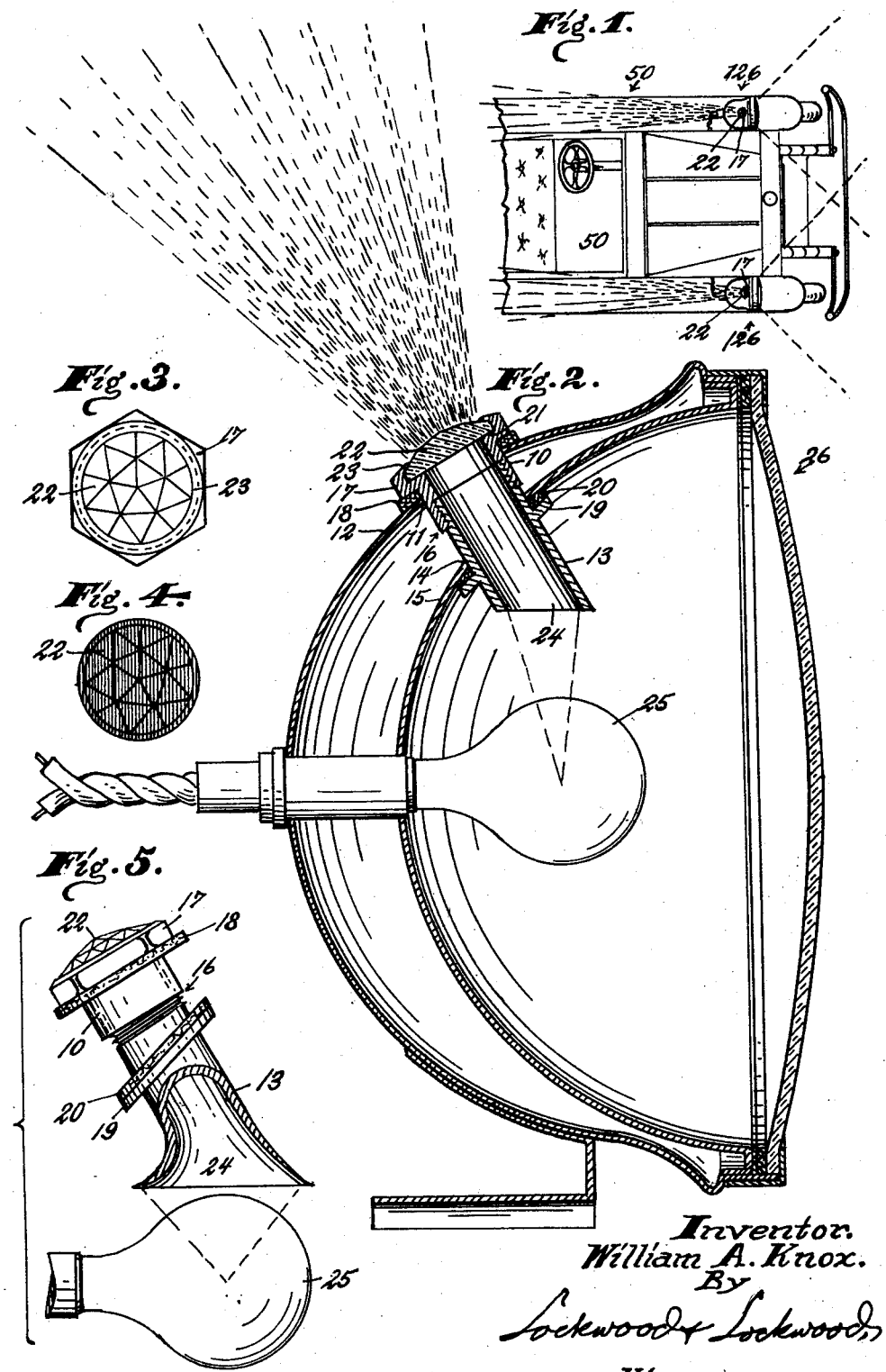
Inventor.
William A. Knox.
By
Lockwood & Lockwood
His Attorneys.

Patented Apr. 11, 1933

1,903,462

UNITED STATES PATENT OFFICE

WILLIAM A. KNOX, OF LOS ANGELES, CALIFORNIA

HEADLIGHT ATTACHMENT FOR AUTOMOBILES

Application filed December 26, 1931. Serial No. 583,307.

This invention relates to an improvement in headlights for vehicles and the principal object is to direct rearwardly some of the light from the headlights, and preferably a flood of colored light for the purpose of illuminating the side and top portions of the vehicle so it is clearly visible from the side and also to enable the driver to know if the headlight lamps are functioning.

It is understood, of course, that there is a headlight at each side of the vehicle preferably mounted on the front wheel fenders or sufficiently to the side of the vehicle to enable the driver to see each headlight and the lights from my attachment thereon and to also illuminate the side of the vehicle with a flood of light that renders it clearly visible from the sides, yet does not interfere with a clear vision toward the front of the car. Obviously, such a flood of colored light clearly illuminating the sides of the car will aid greatly in avoiding sidewise and side-swiping collisions as well as keep the driver informed about the condition of the headlight lamps.

Another object of the invention is to provide the rearward illuminating attachment so it can be detachably secured to the back or side of a headlight in any desired angular position relative to the headlight lamp.

Other objects, advantages and features of invention may appear from the accompanying drawing, the subjoined detailed description and the appended claims.

The accompanying drawing illustrates the invention, in which:

Fig. 1 is a fragmental plan view of an automobile with its headlights provided with my attachments and diagrammatically illustrating how the glow from the headlights is directed by the attachments rearwardly to illuminate the side portions of the automobile.

Fig. 2 is an enlarged central vertical section through a headlight with my attachments detachably secured therein.

Fig. 3 is a plan view of the attachment detached from the headlight.

Fig. 4 is a plan view of the crystal lens diagrammatically indicated as red, it being understood that any suitable colored lens can be used.

Fig. 5 is a semidiagrammatic view of my attachment showing it associated with a headlight lamp and provided with an inlet flanged end.

In detail the illuminating attachment for headlights includes the outer cylindrical member 10 that is inserted inwardly through a hole 11 drilled through the casing 12, and an inner member 13 inserted through a hole 14 through the reflector 15 that registers with the hole 11, and the two members are connected by the screw joint 16.

The member 10 is provided with a hexagon head 17 that is seated on an outer fiber gasket 18 and the member 13 with an annular flange 19 seated on an inner fiber gasket 20 so that when the part 10 is screwed toward the part 13 they form an airtight connection through the parts 12 and 15. The head 17 is recessed to form a seat 21 for the rim of the crystal lens 22 that is shown red for the purpose of illustration, it being understood that the lens can be of any suitable color. The face of the lens is diamond-shape and it is held seated by a flange extension 23 to the head that is milled or swaged over the rim of the crystal, as best shown in Figure 2.

The inner walls of the members 10 and 13 are either highly polished or silvered to form reflecting surfaces for the light that is received in the open end 24 of the member 13 from the headlight lamp 25. If desired, the open end 24 can be flanged or bell-shaped, as shown in Fig. 5, instead of beveled as shown in Fig. 2. Also the attachment can be secured to the head-light 26 so that the flood of red light from the lens 22 can be directed rearwardly as shown in the drawing.

As indicated in Fig. 1, the attachments are secured to the pair of head-lights 126 so their lenses 22 throw a flood of red light along the sides of the vehicle 50 to clearly illuminate it so that persons approaching the vehicle from the sides or at right angle thereto can see the vehicle and thereby avoid sidewise collisions.

It is obvious that with illuminating attachments connected to the headlight 126, as shown in Fig. 1, the driver of the vehicle 50 will know at once if either or both of the lamps in the headlight 126 are in an operative order. It often happens that one or the other of a pair of headlight lamps becomes dead or ineffective, unknown to the driver on account of the brilliancy of the lighted headlight, but with my attachment an unlighted lamp will instantly be detected by the driver.

I claim as my invention:

1. In an automobile headlight having an outer casing, an inner reflector and a lamp, a rearwardly directed cylindrical attachment extending through both the reflector and casing so that its inner end is in close proximity to said lamp and its outer end directed so that the light therefrom will illuminate the side of an automobile, said attachment being composed of an inner member extended through said reflector and having a shoulder integral therewith arranged to engage the inner wall of said reflector and also an outer member extended through said casing that is adapted to be screwed on the outer end of said inner member and having a head with an integral shoulder arranged to engage said casing to limit the inward movement of said outer member, and a colored crystal lens in said head.

2. In a headlight for automobiles, the combination with an outer casing, an inner reflector, a lamp therein, said casing and reflector having registering holes aligned rearwardly, of an attachment therefor including an inner tubular member extended rearwardly through the hole in said reflector and arranged with its inner end adjacent said lamp and its outer end externally threaded, an inner fiber gasket thereon, an annular shoulder integral with said member to force said fiber gasket against the inner wall of said reflector, an outer tubular member extending inwardly through the hole in said casing and having its inner end internally threaded to screw over the outer end of said inner member, an outer fiber gasket thereon, a head integral with said outer member arranged to force said fiber gasket toward the outer wall of said casing, and a colored crystal lens secured in said head.

In witness whereof, I have hereunto affixed my signature.

WILLIAM A. KNOX.